United States Patent
Hwang

(10) Patent No.: US 7,258,587 B2
(45) Date of Patent: Aug. 21, 2007

(54) METHOD OF FORMING PHOSPHOR FILM BY USING AEROSOL IMPACT

(75) Inventor: Dong Hwan Hwang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 214 days.

(21) Appl. No.: 11/062,582

(22) Filed: Feb. 23, 2005

(65) Prior Publication Data

US 2006/0068676 A1 Mar. 30, 2006

(30) Foreign Application Priority Data

Sep. 24, 2004 (KR) .................. 10-2004-0077412

(51) Int. Cl.
*H01J 9/00* (2006.01)
*C09K 11/00* (2006.01)

(52) U.S. Cl. ........... 445/24; 252/301.4 R; 252/301.4 F; 252/301.6 R; 252/301.6 F

(58) Field of Classification Search ........ 313/467–468; 252/301.45, 301.4 F, 301.4 R, 301.6 F, 301.6 R; 445/23–25
See application file for complete search history.

(56) References Cited

U.S. PATENT DOCUMENTS 6,153,123 A * 11/2000 Hampden-Smith et al. ............. 252/301.4 S
2004/0169474 A1 9/2004 Hampden-Smith et al.

FOREIGN PATENT DOCUMENTS

KR 1983-323 3/1983

* cited by examiner

*Primary Examiner*—Joseph Williams
(74) *Attorney, Agent, or Firm*—Lowe Hauptman & Berner

(57) ABSTRACT

A method of forming a phosphor film includes: providing phosphor powder having a particle size of less than 5 μm; subjecting the phosphor powder to vibration so as to form an aerosol containing phosphor powder dispersed therein; and injecting the aerosol into a substrate at a high speed using carrier gas, such that the phosphor powder is impact-solidified on the substrate repeatedly moving at a predetermined speed.

18 Claims, 4 Drawing Sheets

```
┌─────────────────────┐
│   Provision of      │
│   phosphor powder   │─── S21
│   (Φ=~5μm)          │
└──────────┬──────────┘
           ▼
┌─────────────────────┐
│ Formation of aerosol│
│  using vibratory    │─── S23
│    agitation        │
└──────────┬──────────┘
           ▼
┌─────────────────────┐
│ Formation of aerosol│
│ fluid by introduction│─── S25
│  of carrier gas     │
└──────────┬──────────┘
           ▼
┌─────────────────────┐
│ Formation of phosphor│
│ film by high speed  │─── S27
│ injection of aerosol│
│ fluid into substrate│
└─────────────────────┘
```

FIG. 2

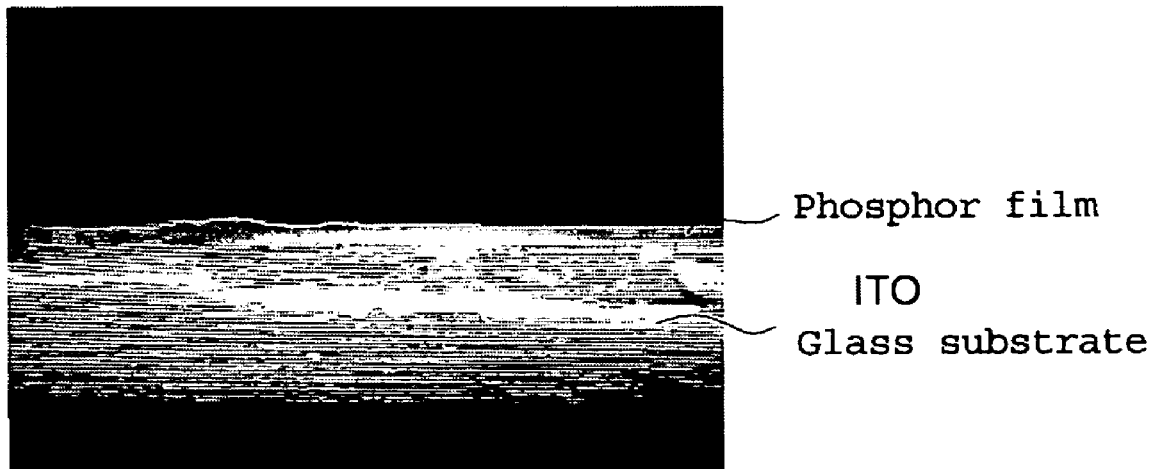
(a)
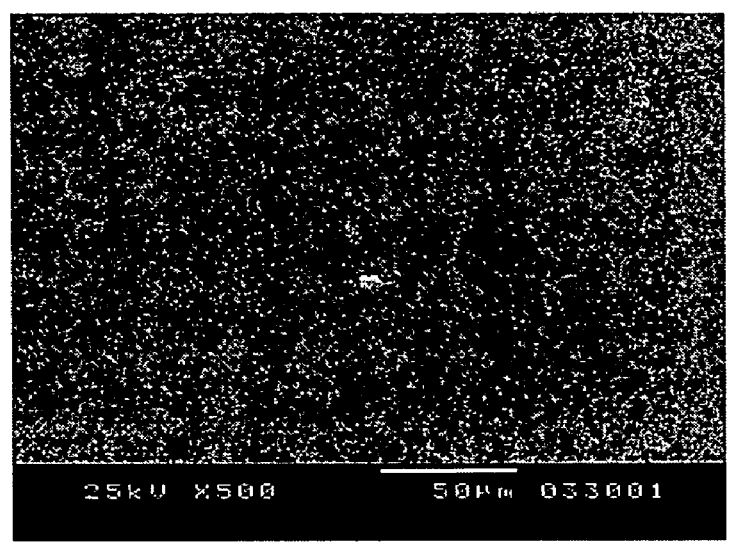
(b)
FIG. 4

METHOD OF FORMING PHOSPHOR FILM BY USING AEROSOL IMPACT

RELATED APPLICATION

The present application is based on, and claims priority from, Korean Application Number 2004-77412, filed Sep. 24, 2004, the disclosure of which is incorporated by reference herein in its entirety.

BACKGROUND OF THE INVENTION

1. Field of the Invention

The present invention relates to a method of forming a phosphor film, and more particularly to a method of forming a phosphor film used in fluorescent displays of a field emission device and display panel.

2. Description of the Related Art

Generally, a phosphor film is widely used in various fluorescent displays of field emission devices and plasma display panels. Techniques relating to such a phosphor film are broadly divided into techniques pertaining to phosphor materials and film formation techniques. In particular, the most important factor in the phosphor film formation technique is uniform distribution of phosphor components in the formed film and their adhesivity to a substrate.

As conventional phosphor film formation techniques, there are, broadly speaking, methods of forming a film using a binder, such as screen printing and spraying, and vapor deposition methods using no binder such as PLD, MOCVD and ALE. Generally, the vapor deposition method as a phosphor film formation process, suffers from a very limited range of applicable phosphor materials, difficulty in realizing a large area required in the devices of interest, and high production cost, thus failing to reach commercialization.

Due to those problems, present commercial phosphor film formation techniques are, broadly speaking, a screen printing process and a spraying process, using the binder. As the representative phosphor film formation technique, the screen printing process is initiated with preparation of phosphor paste by mixing phosphor powder and an organic binder in a solvent. Next, a screen 12 (also, referred to as mesh) is placed on a substrate 11, as shown in FIG. 1, and then the phosphor paste 15 is printed on the substrate 11 through the screen 12 by using a scrubber 14. The phosphors 16 printed on the substrate 11 are heat treated to remove solvent and some of the binder and thereby the desired phosphor film can be formed.

The phosphor film formation technique using the above-mentioned screen printing process requires an additional heat treatment process in order to remove the binder and solvent, and has problems such as deterioration of fluorescence efficiency due to the remaining binder even after heat treatment. In severe cases, the binder decomposes at a high driving voltage, resulting in local falling down of the phosphor film. Meanwhile, where less amount of the binder is used or removing rate of the binder is increased in order to cope with problems associated with the remaining binder, it may rather weaken adhesivity between the substrate and phosphor film and then lead to fatal defects of products. Further, when the field emission device is driven, remaining gas seeps out of the binder inside the field emission system that is under vacuum thus reducing light emitting life span. Therefore, conventional processes using the binder have fundamental problems, and the spraying process using the binder also suffers from those problems.

Further, the conventional screen printing process has disadvantages in that agglomerates occurred due to failure of dispersion into phosphor paste or slurry remain in the phosphor film, thus causing reduction of fluorescence efficiency. In addition, when forming the thin phosphor film, it is difficult to precisely control uniform film thickness unlike the conventional vapor deposition.

Therefore, there remains a need in the art for a new phosphor film formation technique that is suitable for mass production while improving adhesion between the phosphor film and substrate, and fluorescence efficiency and light emitting life span by solving problems due to the binder.

SUMMARY OF THE INVENTION

Therefore, the present invention has been made in view of the above problems, and it is an object of the present invention to provide a novel method of forming a phosphor film having excellent adhesion between the phosphor film and substrate, and high fluorescence efficiency and light emitting life span using aerosol impact solidification without an additional heat treatment process.

In accordance with the present invention, the above and other objects can be accomplished by the provision of a method of forming a phosphor film, comprising:

providing phosphor powder having a particle size of less than 5 μm;

subjecting the phosphor powder to vibration so as to form an aerosol containing phosphor powder dispersed therein; and injecting the aerosol into a substrate at a high speed using carrier gas, such that the phosphor powder is impact-solidified on the substrate repeatedly moving at a predetermined speed.

Preferably, the phosphor powder has a particle size of 0.1 to 3 μm.

In one embodiment of the present invention, the carrier gas may be $N_2$ or other inert gas. Flow rate of the carrier gas supplied for high-speed injection of the aerosol may be 2 to 10 L/min. In addition, injection distance of the aerosol toward the substrate may be in the range of 5 to 50 mm.

Preferably, the step of injecting the aerosol can be performed by injecting the aerosol at an angle between the progressive direction of the aerosol and substrate of 5 to 30°.

The substrate may be glass-based substrates such as ITO glass or slide glass. The phosphor powder may be ZnO based or ZnS based.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a process flow chart illustrating a process for forming a phosphor film using aerosol impact solidification in accordance with the present invention;

FIGS. 4a and 4b are, respectively, SEMs of a phosphor film obtained in Example of the present invention.

DESCRIPTION OF THE PREFERRED EMBODIMENTS

Figure 1:
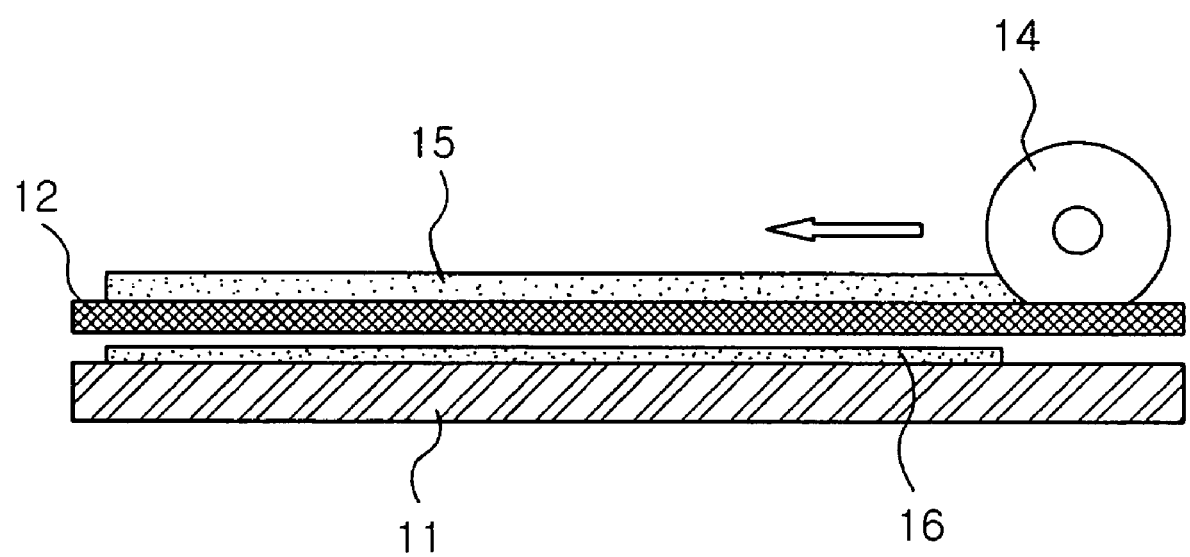
FIG. 1 is a schematic diagram showing a process for forming a phosphor film using a conventional screen printing method.

The present invention will now be described in more detail with reference to the accompanying drawings.

FIG. 2 is a process flow chart illustrating a process for forming a phosphor film using aerosol impact solidification in accordance with the present invention.

The process for forming a phosphor film in accordance with the present invention is initiated by preparing particulate phosphor powder (S21). The phosphor powder used in the present invention is provided in the form of a powder having a particle size of less than 5 µm in order that film formation can be effected by aerosol impact solidification. Preferably, the phosphor powder has a particle size of about 0.1 to about 3 µm. If the particle size of the phosphor powder is less than 0.1 µm, it is difficult to form the film due to the low impact energy, while if the particle size exceeds 3 µm, film formation does not progress well and even when the phosphor film is formed, light emission characteristics may be somewhat degraded. Usable phosphor powders include, but is not limited to, ZnO, ZnS or YAG based phosphor powder.

Next, the phosphor powder is subjected to vibratory agitation so form an aerosol (S23). The process of forming the aerosol is performed by vibration. Vibratory agitation conditions employed in this step may be easily selected by those skilled in the art.

Subsequent to the aerosol formation step (S23), the aerosol of the phosphor powder is formed into an aerosol fluid using a carrier gas (S25). In order to prevent unwanted chemical reactions with phosphor materials, nitrogen ($N_2$) or other inert gas such as He and Ne is preferably used as the carrier gas. Flow rate of the carrier gas is set to a range of between about 2 and 10 L/min. An aerosol production bath is set such that it maintains a near vacuum state of about 5 Pa before introducing the carrier gas, and when injecting the aerosol fluid at the point of introducing carrier gas, internal pressure thereof is in the range of 100 to 1000 Pa.

When a desired high-pressure condition is established by introduction of the carrier gas, the aerosol fluid is injected toward the substrate at a high speed by that pressure and the phosphor powder in the aerosol fluid is formed into a phosphor film on the substrate by an impact solidification mechanism (S27). Since the aerosol fluid is injected in the given direction, the direction of the substrate or an injection nozzle is repeatedly moved to a suitable trajectory, depending on the area of a phosphor film to be formed. Injection distance, which is defined as the distance between the aerosol injection nozzle and substrate, is preferably set in the range of 5 to 50 mm, so as to improve film quality.

Specifically describing the impact solidification mechanism employed in this process, high-speed injected aerosol fluid collides with the substrate and the resulting impact energy serves as binding energy between the phosphor powder and substrate and binding energy between the phosphor powders. Thereby, the phosphor powder is anchored on the substrate in solidified state, thus resulting in formation of a phosphor film. Therefore, it is possible to obtain the phosphor film without an additional heat treatment process to dry and degrease, and also fundamentally solve problems such as reduction of fluorescence efficiency due to the binder and reduction of light emitting life span due to gas discharged from the binder, shown in conventional arts. In addition, since the aerosol impact solidification used in the method of forming the phosphor film in accordance with the present invention can realize formation of the phosphor film with only control of particle size while providing precise control of the film thickness, as in the conventional vapor deposition process, there is no particular limit to applicable phosphor materials.

Further, it is possible to improve characteristics of the phosphor film by repetitive movement of a substrate holder while maintaining the direction of the aerosol injection nozzle relative to the substrate at an inclined state of a predetermined angle when injecting aerosol. In order to accomplish improvement of the phosphor film characteristics, the angle between the substrate and the injection direction is preferably between about 50 to about 30°.

Figure 3:
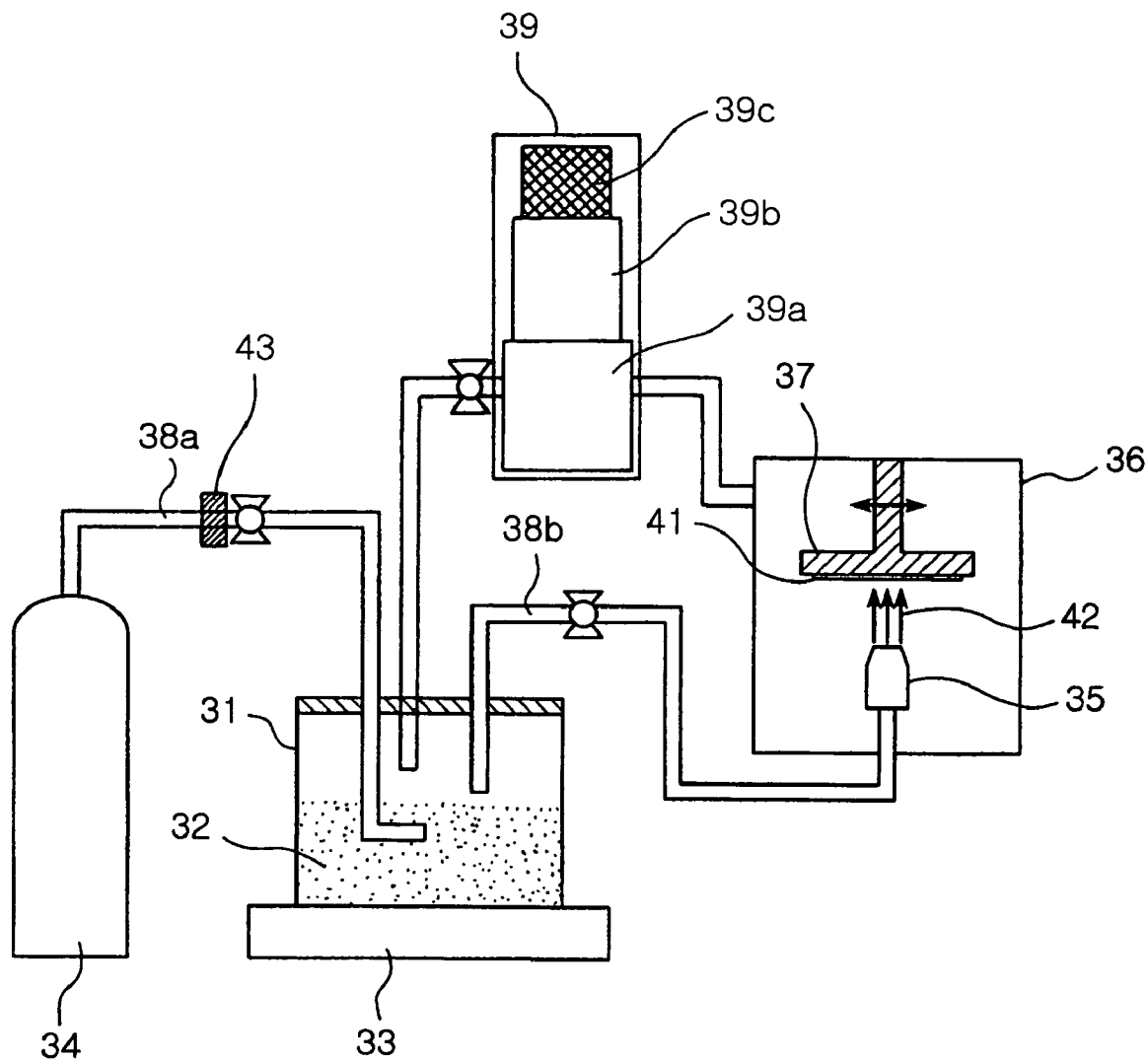
FIG. 3 is a schematic diagram showing one example of an aerosol film forming apparatus used in a method of forming a phosphor film in accordance with the present invention.

FIG. 3 shows an aerosol film formation apparatus that can be used to realize a method of forming a phosphor film of the present invention.

Referring to FIG. 3, the aerosol film formation apparatus includes an aerosol production bath 31 storing phosphor powder 32, a carrier gas reservoir 34 connected to the aerosol production bath 31 via a first conveying pipe 38a, a film formation chamber 36 in which a film formation process is performed, and a vacuum generating apparatus 39 for maintaining the entire internal system to a near vacuum state.

The aerosol production bath 31 and film formation chamber 36 is connected to a vacuum generating apparatus 39. The vacuum generating apparatus 39 may be comprised of a suction pump 39a, a main pump 39b and discharge pump 39c. In addition, the aerosol production bath 31 is connected to the vibration apparatus 33 which provides vibratory agitation. The film formation chamber 36 includes a movable substrate holder 37 having the substrate 41 mounted thereon, and a nozzle connected to the aerosol production bath 31 via a second conveying pipe 38b. The movable substrate holder 37 is configured to be repetitively movable to a predetermined trajectory, and preferably can be controlled such that the nozzle 35 injects the aerosol at a predetermined angle relative to the substrate 41.

Illustrating operation of the aerosol film formation apparatus, the inside of the aerosol production bath 31 and film formation chamber 36 is made vacuum by the vacuum generating apparatus 39. The phosphor powder 32 (average particle size of less than 5 µm) received in the aerosol production bath 31 is formed into an aerosol by vibratory agitation action of the vibration apparatus 33. Upon formation of the aerosol, the valve of the first conveying pipe 38a is opened, carrier gas such as $N_2$, He or Ar from the carrier gas reservoir 34 flows into the aerosol production bath 31, and a flow controller 43 disposed between the valve and carrier gas reservoir 34 controls the flow rate of the carrier gas so as to form a high pressure state in the aerosol production bath 31. When the valve of the second conveying pipe 38b is opened, the aerosol fluid from the aerosol production bath 31 is injected at high speed via the nozzle 35 placed inside the film formation chamber 36 toward the substrate 41. At this time, the substrate 41 can be repetitively moved by the movable substrate holder 37, depending on the area and thickness of a phosphor film to be formed as described above. Additionally, characteristics of the phosphor film may be further improved by disposing the injection nozzle 35 at a predetermined angle of inclination relative to the substrate.

Now, the present invention will be described in more detail with reference to the following example.

EXAMPLE

This example was performed using an apparatus similar to an aerosol film formation apparatus as shown in FIG. 3, in order to confirm the fact that a phosphor film can be formed by aerosol impact solidification.

First, ZnS based phosphor powder was uniformly prepared to have an average particle size of 0.4 μm corresponding to a range of particle size presented in the present invention. Then, the prepared ZnS based phosphor powder was charged to an aerosol production apparatus and an ITO glass substrate was mounted on a movable substrate holder in a film formation chamber.

Next, the inside of the film formation chamber and aerosol production apparatus was made vacuum using a vacuum generating apparatus. The phosphor powder was then formed into an aerosol state by vibratory agitation action of the vibration apparatus. Then, He as the carrier gas was supplied at a flow rate of 7 L/min so as to raise the pressure in the aerosol production chamber to about 200 to 1000 Pa, and thereafter the aerosol fluid composed of the carrier gas and phosphor powder was injected to the substrate at high speed via the injection nozzle. When the phosphor aerosol collided with the substrate through such injection, the resulting impact energy serves as binding energy between the phosphor aerosol and substrate and thus the phosphor aerosol solidified and formed a ZnS based phosphor film. Such a film formation process was carried out for about 10 min and the internal temperature of the film formation chamber was maintained at 20° C.

At this time, spacing between the substrate and nozzle was maintained at about 10 mm, a moving trajectory of the substrate was set to form an about 1 cm² phosphor film on the substrate, and the movable substrate holder was operated to be able to move at a rate of 1.25 mm/sec along the trajectory.

After completing a desired film formation process, flow of the carrier gas was stopped, vacuum state in the film formation chamber was released, operation of the substrate holder was stopped, and the substrate having the ZnS based phosphor film formed thereon was removed and conditions of the ZnS based phosphor film were observed.

FIGS. 4a and 4b show, respectively, SEMs of a phosphor film obtained in the above-mentioned Example.

As can be seen from FIG. 4a, a phosphor film was formed on an ITO substrate in a uniform thickness. It was found that the overall height profile of the film was very uniform. This confirmed that the aerosol impact solidification could provide precise control of the film thickness, which was achieved in the above deposition process, in the phosphor film formation process of the present invention as well.

FIG. 4b shows a photograph of a phosphor film surface obtained in this example. Referring to FIG. 4b, it can be confirmed that the phosphor film was uniformly formed over the entire area without a region in which the phosphor film was not grown. In particular, since the process for forming the phosphor film in accordance with this example does not use a binder, there are advantages in that it is possible to eliminate a subsequent heat treatment process, and to fundamentally solve the problem associated with reduction of fluorescence efficiency due to the remaining binder.

When the ZnS based phosphor film, which was obtained through this example, formed on the ITO substrate was applied to a field emission device and was light emitted, it was confirmed that red light was emitted from the ITO glass substrate.

Therefore, in accordance with the present invention, it was possible to obtain the phosphor film having a uniform thickness and excellent adhesivity and fluorescence properties even from particulate powder, in particular, particulate powder having a submicron size, using an aerosol method. Such particulate powder exhibited disadvantages such as difficulty in uniform dispersion and film formation in the conventional method using phosphor paste, but the present invention can also solve these problems.

As described above, in accordance with the present invention, a phosphor film is formed using only phosphor powder by aerosol impact solidification and thereby it is possible to eliminate an additional heat treatment process due to use of the binder and to fundamentally solve problems such as reduction of fluorescence efficiency due to the remaining binder and reduction of a light emitting life span due to discharge gas generated from the binder. In addition, use of the aerosol impact solidification used in the method of forming a phosphor film in accordance with the present invention has an advantage of providing precise control of the film thickness as in a conventional vapor deposition process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of forming a phosphor film, said method comprising the steps of:
    providing phosphor powder having a particle size of 0.1 to 3 μm;
    subjecting the phosphor powder to vibration so as to form an aerosol containing phosphor powder dispersed therein; and
    injecting the aerosol into a substrate at a high speed using a carrier gas, such that the phosphor powder is impact-solidified on the substrate to form the phosphor film on the substrate, while repeatedly moving the substrate at a predetermined speed;
    wherein the flow rate of the carrier gas is within the range of 2 to 10 L/min.

2. The method of forming a phosphor film as set forth in claim 1, wherein the carrier gas is nitrogen ($N_2$) or inert gas.

3. The method of forming a phosphor film as set forth in claim 1, wherein the step of injecting comprises injecting the aerosol from a nozzle towards the substrate, and an injection distance from the nozzle to the substrate is within the range of 5 to 50 mm.

4. The method of forming a phosphor film as set forth in claim 1, wherein the step of injecting the aerosol includes injecting the aerosol at an angle relative to the substrate, said angle being of 5 to 30°.

5. The method of forming a phosphor film as set forth in claim 1, wherein the substrate is an ITO glass based substrate.

6. The method of forming a phosphor film as set forth in claim 1, wherein the phosphor powder is ZnO based or ZnS based phosphor powder.

7. The method as set forth in claim 1, wherein the phosphor powder is YAG based phosphor powder.

8. The method as set forth in claim 1, wherein the aerosol is formed under near vacuum conditions.

9. The method as set forth in claim 1, wherein the step of injecting is performed in a film formation chamber having an internal temperature of about 20° C.

10. The method as set forth in claim 1, wherein, during the injecting step, particles of the phosphor powder in the aerosol are adhered to the substrate upon impact therewith, without using a binder for bonding the particles to the substrate.

11. A method of forming a phosphor film on a substrate, said method comprising the steps of:
    forming an aerosol of solid particles of phosphor powder having a particle size of less than 5 μm;
    injecting the aerosol, using a carrier gas, into the substrate at a speed sufficient to cause the particles of phosphor powder dispersed in the aerosol to collide with the substrate with sufficient impact energy that binds the phosphor powder to the substrate, thereby forming the phosphor film on the substrate without using a binder or heating the substrate.

12. The method of claim 11, wherein the step of injecting the aerosol includes injecting the aerosol at an angle relative to the substrate while repeatedly moving the substrate along a predetermined trajectory;
    said angle being of 5 to 30°.

13. The method of claim 12, wherein
    the flow rate of the carrier gas is within the range of 2 to 10 L/min;
    the particle size of the phosphor powder is 0.1 to 3 μm; and
    the step of injecting comprises injecting the aerosol from a nozzle towards the substrate, and an injection distance from the nozzle to the substrate is within the range of 5 to 50 mm.

14. The method of claim 13, wherein
    the carrier gas is nitrogen ($N_2$) or an inert gas;
    the substrate is an ITO glass based substrate; and
    the phosphor powder is ZnO based, or ZnS based, or YAG based phosphor powder.

15. The method as set forth in claim 13, wherein the aerosol is formed at a pressure of about 5 Pa.

16. The method as set forth in claim 15, wherein the carrier gas in the step of injecting has a pressure of 100-1000 Pa.

17. The method as set forth in claim 16, wherein the step of injecting is performed in a film formation chamber having an internal temperature of about 20° C.

18. The method of claim 11, wherein the step of injecting the aerosol includes injecting the aerosol at the substrate while moving the substrate along a predetermined trajectory.

* * * * *